United States Patent [19]

Bullock et al.

[11] 4,406,425
[45] Sep. 27, 1983

[54] METHOD AND APPARATUS FOR REGULATING WEBS TRANSPORTED IN A REEL-TO-REEL WEB HANDLER

[75] Inventors: Joseph G. Bullock; William J. Rueger, both of Tucson, Ariz.

[73] Assignee: International Business Machines Corporation, Armonk, N.Y.

[21] Appl. No.: 332,261

[22] Filed: Dec. 18, 1981

[51] Int. Cl.³ .................. G11B 15/06; G11B 15/58; G11B 23/12
[52] U.S. Cl. ........................ 242/183; 226/97
[58] Field of Search ............... 242/182, 183, 185, 189, 242/190; 226/7, 95, 97; 360/71, 73

[56] References Cited

U.S. PATENT DOCUMENTS 3,866,855  2/1975  Bryer .................................. 242/184
3,890,641  6/1975  Mo et al. ............................. 360/71

Primary Examiner—Leonard D. Christian
Attorney, Agent, or Firm—Herbert F. Somermeyer

[57] ABSTRACT

A web transport, such as a reel-to-reel magnetic recorder, includes a web regulator between one reel and a transducing station. In a constant tension web transport, web regulator ensures a relatively constant length of web between the transducing station and the one reel. In a preferred form the regulator is a vacuum chamber having a narrow web receiving opening and a wider cavity such that as the web forms a bight in the chamber into said wider cavity, air flows past the web to regulate bight size in accordance with web tension tending to maintain a constant web length.

15 Claims, 4 Drawing Figures

METHOD AND APPARATUS FOR REGULATING WEBS TRANSPORTED IN A REEL-TO-REEL WEB HANDLER

FIELD OF THE INVENTION

The present invention relates to high performance web handlers, particularly those web handlers for information-bearing webs.

BACKGROUND OF THE INVENTION

Webs in the form of magnetically-coated tapes have been used for several years for recording digital data received from data processing equipments of all types. Additionally, such webs have been used for audio and video applications as well. For data processing applications, it is desired that access to data recording areas on the web occur rapidly. To this end, so-called vacuum columns, such as shown in Weidenhammer, et al, U.S. Pat. Nos. 3,057,568 and 3,057,569, are employed to provide a buffer between web or tape containing reels and a transducing or work station. The arrangement is such that a capstan rapidly accelerates the web to provide the rapid access with the vacuum columns providing a low inertial length of web for permitting rapid acceleration and the resulting rapid access. The vacuum columns decouple the work station from the reel of tape such that a relatively short length of the web could be accelerated while the reel was being rotationally accelerated. In this arrangement, the bight of the web formed in the vacuum column varied in length as the reel inertia was compensated for. Typically, during stop-start motions of such a web handler, the length of the bight in the vacuum column varies dramatically. An improvement over the Weidenhammer, et al, vacuum column is shown by Wicklund, et al., U.S. Pat. No. 3,112,473 wherein the walls of the vacuum columns are tapered such that as the bight became longer it also became narrower, which decreased the pull on the web. A later tapered column is shown in Epina, et al, U.S. Pat. No. 4,189,113. Wicklund, et al, also teach that a plurality of vacuum columns interposed between a work station and a web containing reel provide certain advantages in mechanically buffering the reel from the work station. Other forms of secondary buffers are shown by Reader, U.S. Pat. No. 3,202,373 and Schoeneman, U.S. Pat. No. 3,176,894. All of these improvements over Weidenhammer, et al, were directed toward improving the access to data areas on the web by using a vacuum column as a web buffer storage.

Various designs of web vacuum buffer storage apparatus have been employed for not only providing the buffer storage, but also for controlling the bight in the buffer storage and performing auxiliary web-controlling functions. Dickinson, et al in U.S. Pat. No. 3,645,470, show an air passageway extending between two side-by-side vacuum columns to serve as a clamp, such that when a web is loaded into the vacuum columns it will load into both columns. The clamp limits the slip of the web over a capstan such that the web enters both vacuum columns. This control limits the transport of the web between adjacent vacuum columns during the loading process. In this arrangement, a work station or transducer station was integral to one of the vacuum columns. Grant, in U.S. Pat. No. 3,986,651, shows a symmetrical web transport arrangement wherein concave vacuum assisted guides are used for guiding the web past a work or transducer station with vacuum columns stabilizing the flow of tape, i.e. decoupling the capstan from the web containing reels. Grant, in U.S. Pat. No. 3,281,040, also shows a vacuum assisted guide wherein slots along the guides permit air flow for controlling the web within the vacuum chamber guide. Stange, in U.S. Pat. No. 4,218,026, shows a vacuum arrangement with an adjustable side, ostensibly for taking various widths of webs. Welch, in U.S. Pat. No. 3,266,691, shows a series of tapered vacuum loop boxes such as originally taught by Wicklund, et al, supra, for preventing breakage of the web during rapid acceleration-deceleration. Hawley, in the IBM Technical Disclosure Bulletin, Feb. 9, 1975, on page 2567 in an article entitled "Contour Vacuum Column," shows a flexible shim and a shaped side wall in a vacuum column for accommodating slewing of the web during transport for providing guiding of the web toward a work station. Tape tension control also has received attention by Janssen, et al in the IBM Technical Disclosure Bulletin, February, 1975, page 2564 wherein a so-called soft vacuum pocket redistributes tension uniformly across the tape. The soft vacuum pocket is bracketed in the tape path by a pair of air bearings. The tape tension redistribution device eliminates non-uniform stresses or tensions in the tape, which, among other things, accommodates skewing caused by misaligned reels. Such skewing appears in the tape as a curvature between the two misaligned reels.

In a high performance reel-to-reel web transport, such as used in a reel-to-reel magnetic tape recorder, uniform tension is applied to the web during rapid acceleration-deceleration. Standing waves can be induced into the web such that there are differing tape tensions along the tape path between the reels. Further, as the wrap of the web on either of the reels varies, the angle of approach from the reel to the web transport path changes. This change in angulation can affect the length of web disposed between the reel and a work station and disposed between the two reels in the reel-to-reel transport. Further, the web may have a lateral curvature induced from being stored on a reel. All of these factors could be accommodated before the web is transported past the work station while maintaining the length of the web between a reel and a work station to be substantially constant. While the vacuum column buffers of the prior art provide for good mechanical buffering, such buffers require substantial space and are costly. Therefore, it is desired to eliminate the vacuum buffers while still maintaining good control over the web during acceleration and deceleration. When a web 15, such as a magnetically coated plastic substrate recording tape, is stored on a reel, such storage may result in certain undesirable shape changes (tape may curl laterally); for reliable magnetic recording operations, such changes should be accommodated within a short distance of the supply reel. Such accommodation could minimize tape transport length for a reduced cost recorder.

SUMMARY OF THE INVENTION

It is an object of the present invention to provide a web controller which is interposable between a pair of web-containing reels and a work station for providing an enhanced web handling device. It is a corresponding object to provide and enhance web-handling devices of the reel-to-reel type to accommodate various pertubations in the web being transported and in web transport characteristics.

A reel-to-reel web handler having uniform tension control means includes a web bight forming means disposed between a work station and a web-containing reel such that a controlled bight is formed between the work station and one of the reels. The bight is controlled to maintain a relatively constant length of web between the work station and the one reel regardless of angulation changes and accommodates lateral curvature of the web before the web reaches the work station as well as accommodating uniform tension variations for eliminating tension waves from the web before the web arrives at the work station.

In the preferred form of the invention, the bight forming means is a vacuum chamber having a web receiving portion which receives the web in an air sealing relationship with an air exhaust portion having a cavity with a greater wall-to-wall dimension than the web receiving portion such that as the web enters the air exhaust portion, the pull on the web is controllably reduced for regulating the bight of the web in accordance with the greater wall-to-wall dimension and air exhaust flow. This control accommodates perturbations in uniform tension to establish a substantially constant length of web between a work station and a web containing reel.

The invention includes method and apparatus achieving the above-stated functions.

The foregoing and other objects, features, and advantages of the invention will be apparent from the following, more particular description of the preferred embodiments of the invention, as illustrated in the accompanying drawings.

DETAILED DESCRIPTION

Figure 1:
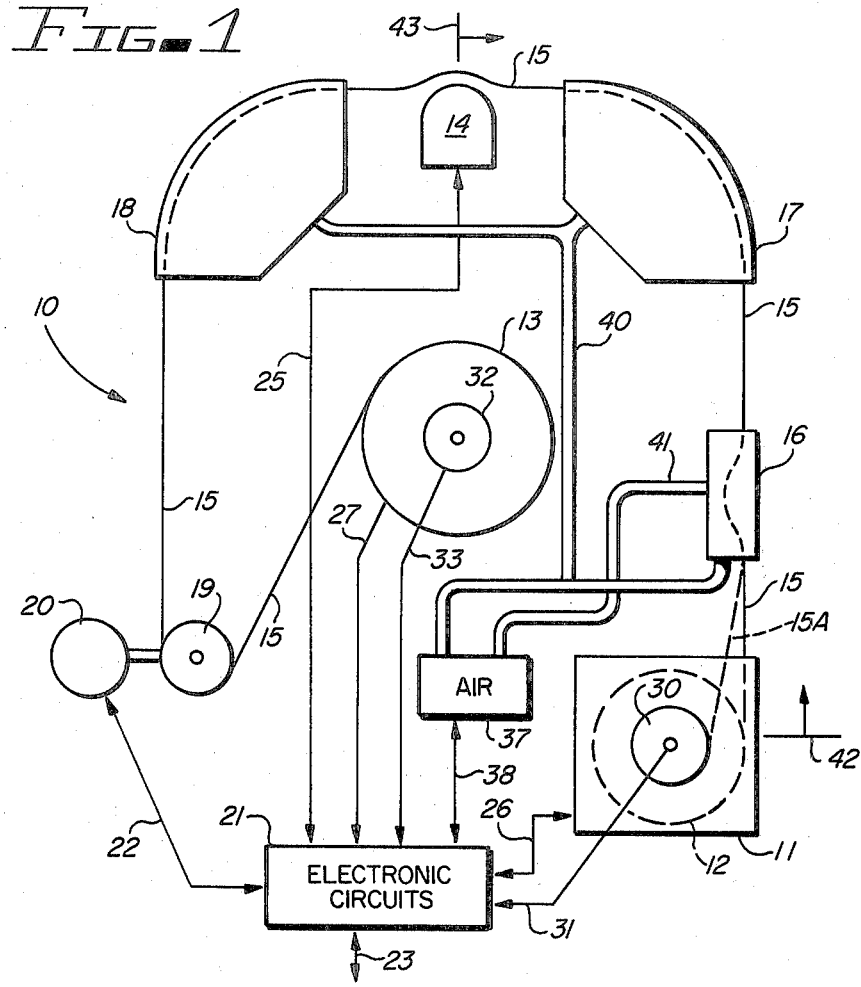
FIG. 1 is a diagrammatic plan view of a reel-to-reel tape recorder having a web handler constructed in accordance with the present invention.

Referring now more particularly to the drawing, like numerals indicate like features in the various figures.

FIG. 1 illustrates magnetic tape recorder 10 which embodies the present invention. A magnetic tape (web) containing cartridge 11 is removably installed at one corner of recorder 10. The free end portion of a magnetically-coated web 15 is automatically transported by recorder 10 over a transport path to a permanent or machine reel 13. The web 15 from reel 12 first passes through tape controller 16, which embodies the present invention and as later described with respect to FIGS. 2, 3 and 4. From controller 16, web 15 passes through arcuate guide 17 to pass over transducer or work station 14. Air bearing arcuate guide 18 receives web 15 from work station 14 in a manner such that positive pressure is exerted by web 15 onto the web-facing surface of transducer 14 for ensuring a good so-called recording platform, i.e. ensures a good exchange of signals between the magnetic coating on web tape 15 and transducer 14. From guide 18, web 15 loops over tension idler wheel 19, then proceeds to machine reel 13. Direction of tape transport over the just described path is reversible. Tension idler wheel 19 is supported by tension transducer 20 for indicating, via electrical connection 22, to electronic circuits 21 the sensed tension of web 15 as it is being transported or being held. Electronic circuits 21 respond to the tension indication supplied over connection 22 to control the rotation of reels 12 and 13. Circuits 21 additionally are connected to a using unit (not shown) via a bus 23. The using unit supplies commands to electronic circuits 21 which include commands to move the web 15 between reels 12 and 13, as well as to record signals via bus 25 and transducer 14, receive signals from transducer 14, via bus 25 for transferring signals between the magnetic record area on web 15 and the using unit.

Electronic circuits 21 also include the usual servocontrol circuits which control the speed of the web 15 transport. Associated with each of the reels 12 and 13 is a motor (not shown) controlled by electrical signals supplied by electronic circuits 21 respectively over electrical connections 26 and 27 which coordinate the rotation of reels 12 and 13 using known reel-to-reel control techniques. Tachometer wheels 30 and 32, respectively on reels 12 and 13, provide rotational-speed indicating signals respectively over lines 31 and 33 to electronic circuits 21 for implementing the servo control. Additionally, the signals from tachometer wheels 30, 32 also indicate web displacement. In particular, tachometer wheel 30 is used by electronic circuits 21 to indicate the amount of web 15 unwound from reel 12. Such displacement indication is used in combination with addresses recorded on web 15 for addressing record areas on web 15.

Electronic circuits 21 also control the operation of air supply mechanism 37 via control lines 38. Air supply mechanism 37 supplies air under pressure through conduit 40 to arcuate air bearings 17 and 18 and to air bearings, later described, in web controller 16. Air supply mechanism 37 also exhausts air through conduit 41 from controller 16 for providing the so-called vacuum chamber used in connection with regulating web 15 as it is transported between reel 12 and transducing or work station 14. In a constructed embodiment of the invention, air mechanism 37 provides a constant air flow through conduit 41 which results in a pulling force on web 15 greater than the tension provided to web 15 by the coordinated control of reels 12 and 13. Such greater force is used as later described to achieve the functions of the present invention. The air flow through conduit 40 is also at a constant pressure.

Figure 2:
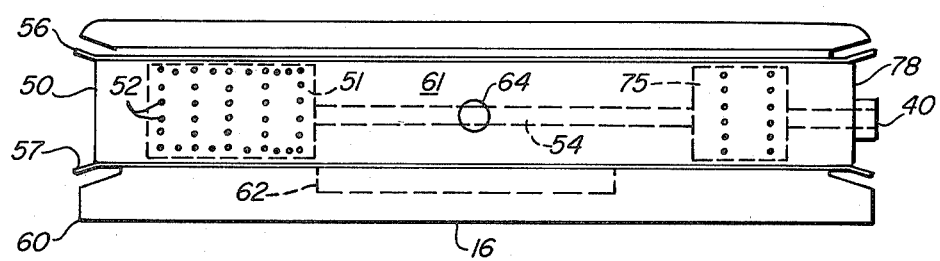
FIG. 2 is a plan view of a web controller constructed in accordance with the present invention and used in the web handler shown in FIG. 1.
Figure 3:
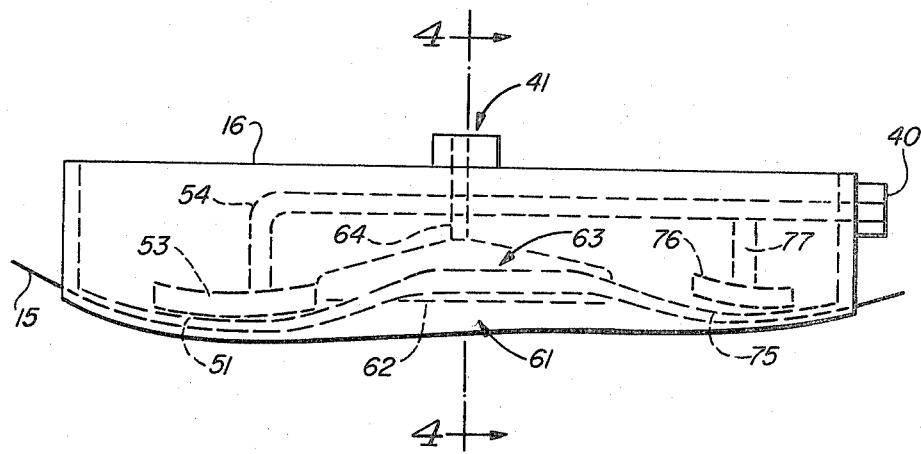
FIG. 3 is a side elevational view of the controller shown in FIG. 2.
Figure 4:
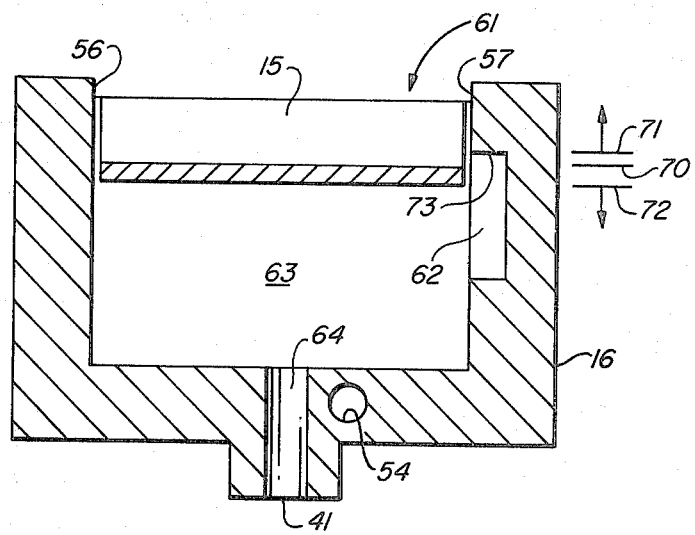
FIG. 4 is a sectional view of the web controller as seen in the direction of the arrows 4—4 in FIG. 3.

Since tachometer wheel 30 is used in connection with address positioning of web 15, the web length between reel 12 and transducing station 14, as represented by arrows 42 and 43, should remain relatively constant, i.e. to make the addressing predictable at transducing station 14. Such constant length of tape should be determined independent of the angulation of the tape as it leaves reel 12 as represented by dash line 15A for a small amount of web remaining on reel 12 versus the angulation with a full reel as represented by line 15. Controller 16, next described with respect to FIGS. 2 through 4, provides several regulating controls for maintaining a substantially constant length of web 15 as well as ensuring a relatively flat surface on web 15 as it passes transducing or work station 14.

Controller 16 receives web 15 from reel 12 at leading edge 50 of a web guiding portion. A convex tape receiving surface beginning at leading edge 50 includes air bearing area 51 having a plurality of air apertures 52 releasing air from plenum 53. Plenum 53 is in fluid communication with air pressure conduit 40 via air passageway 54 the convex surface including air bearing 51 has tape guides 56, 57 for guiding web 15 centrally over the air bearing surface 51. From air bearing surface 51, web 15 enters web receiving portion 61 of a vacuum chamber which provides length regulation of tape 15, as will become apparent. When web 15 is flat, the web forms an air seal in receiving portion 61 with guides 56, 57 such that air exhausted through conduit 41 provides a maximal force on web 15. Since the air exhausted through conduit 41 exceeds the tension on web 15, web 15 is pulled through receiving portion 61 into air exhaust portion 63 of controller 16. Air exhaust portion 63 includes air valving slot 62 which breaks the air seal for allowing air flow past web 15 through air exhaust portion 63 then air passageway 64 to air exhaust conduit 41. Such air flow regulates the web 15 position to a point of equilibrium with the tension on web tape 15 provided through the control of reels 12, 13 by electronic circuits 21. As best seen in FIG. 4, the bight, which in the illustrated embodiment is a relatively shallow bight or dimple, has a nominal tape position 70 which occurs during constant-speed web transport or when web 15 is stationary. During acceleration and deceleration phases of web transport, the uniform tension exerted on web 15 is subject to perturbations which are accommodated by controller 16 to keep a constant length of web between supply reel 12 and transducer 14. When the tension increases, then the bight in tape 15 within air exhaust portion 63 tends to shorten up to upper limit 71 for accommodating an increasing tension. In the constructed embodiment, upper limit 71 is determined by upper shoulder 73 of air valving slot 62. At shoulder 73, the air pull on web 15 exceeds the web tension preventing further shortening of the bight. At this point, reel 12 will rotate to allow more web 15 to keep the web length 42, 43 substantially constant by accommodating variations in web tension. When tension on web 15 is reduced, then the bight in air exhaust portion 63 tends to increase up to a lower level 72 for accommodating the reduced web tension. Web 15 moves past air valving slot 62 toward conduit 64. Further decreasing tension on web 15 allows more air to bypass web 15 further reducing the bight forming force induced by air exhausted through conduit 64.

Further, when web 15 leaves reel 12 during acceleration or deceleration of the web, certain fluttering may occur. The described action of controller 16 removes the flutter from the web such that a reliable recording platform is maintained at transducing station 14. All of the above shows that variations in web 15 transport behavior as it leaves reel 12 are accommodated in controller 16 such that as the web 15 leaves controller 16 the web 15 longitudinal edges are in line and the web is equalized in tension. Accordingly, it is desirable to place controller 16 relatively close to removable cartridge 11 such that web transport is consistent over a maximal portion of the transport path.

Web 15 leaves portions 61, 63 of controller 16 by moving over a second air bearing 75 which receives air under pressure from plenum 76 passageways 77 and 54 and conduit 40. At 78, web 15 leaves controller for guiding to work station 14 through arcuate air bearing guide 17.

In accordance with all of the above, it is seen that a relatively small vacuum chamber 62, 63 including the regulating effect of air valving slot 62 provides an effective decoupling of the transducing station 14 from web transport perturbations that may occur as web 15 leaves supply or removable reel 12. While the invention has been particularly shown and described with reference to preferred embodiments thereof, it will be understood by those skilled in the art that various changes in form and details may be made therein without departing from the spirit and scope of the invention.

What is claimed is:

1. A reel-to-reel web handler having tension control means tending to maintain a uniform tension in a web extending a transportable between two reels, means to change the speed of web transport between reels which may introduce perturbations in said tension, a work station disposed between said two reels for performing work on said web;

the improvement including in combination:
   bight forming means disposed between said work station and one of said reels for receiving said web to form a bight therein and bight regulation means in said bight forming means for maintaining a relatively constant bight during tape stoppage and motions irrespective of modest tension changes for controlling the length of web between said work station and said one reel to be relatively constant length;
   said bight forming means having an air evacuated chamber including a pair of spaced and facing sidewalls having a spacing substantially equal to width of said web whereby as said web enters said chamber a substantial air sealing relationship is established; and
   said bight regulating means being in said chamber and including an elongated slot in one of said sidewalls and having an upper shoulder extending in the direction of web motion and crosswise of the bight of tape for allowing air to flow past said tape through said slot into said chamber such that the bight of said tape in said chamber tends to stabilize adjacent said upper shoulder.

2. The web handler set forth in claim 1 further including air-bearing means juxtaposed to said bight-forming means such that said web is supported by said air-bearing means as it passes through said bight-forming means; and
   a pair of elongated guides extending along the path of travel of said web through said bight-forming means and over said air-bearing means for guiding the web thereacross.

3. The web handler set forth in claim 1 or 2 further including an electronic circuit control coupled to said two reels for controlling rotation of said two reels to transport said web therebetween;
   said web having a signal retaining property;
   transducer means disposed adjacent to said web for transferring recording signals therewith and coupled to said electronic circuit control for transferring said recording signals therewith; and
   web path defining means disposed between said reels, said transducer means and said bight-forming means to guide said web as the web is transported between said reels.

4. A web-handling vacuum chamber structure having an upper web-receiving portion having a web-receiving opening and a lower air-exhaust portion, said web-receiving portion having a pair of parallel and facing side walls spaced apart so as to movably receive a web through said web-receiving opening in a substantial air sealing relation whereby air exhausted from said air-exhaust portion tends to pull any web in said web-receiving portion toward said air-exhaust portion and said air-exhaust portion including a cavity section with a greater spacing than the spacing between said side walls such that as the web moves from the web-receiving portion into said air-exhaust portion said air seal is broken allowing air to flow past said web for reducing said tendency to pull whereby said web stays in a relatively constant position in said structure for a given web tension.

5. The chamber structure set forth in claim 4 wherein said air-exhaust portion includes a portion of both said side walls and a one of said side walls has a slot opening into said air-exhaust portion and constituting a portion of said cavity section.

6. The chamber structure set forth in claim 4 wherein said portions constitute a single cavity intermediate said side walls being open via said web receiving opening whereby a second of said side walls in a reference surface for web transfer and said cavity section includes a slot opening into said single cavity, said slot having an upper shoulder extending substantially transversely to said one side wall and being elongated in the direction of web transport such that a sharp demarcation of cavity width occurs at said upper shoulder.

7. The chamber structure set forth in claim 4, 5 or 6 wherein said structure is elongated along the direction of web transport and the depth of said single cavity is shorter than its longitudinal extent.

8. The chamber structure set forth in claim 7 further including an air bearing on each end portion of the web single cavity along the direction of web transport and a pair of web guides extending along said side walls and past both said air bearings for defining a web transfer path through said chamber structure.

9. A web-regulator structure comprising;
a pair of spaced apart logitudinally elongated guides for defining a longitudinal web transport path through said structure, said structure having center and opposite longitudinal end portions;
first and second air bearings disposed between said guides at respective opposite longitudinal end portions;
air conduit means in fluid communication with said air bearings for supplying air thereto;
vacuum chamber means disposed intermediate said guides in said center portion and having a pair of longitudinally-extended, spread-apart side walls disposed somewhat parallel to said guides for establishing a chamber cavity for receiving a web disposed between said guides; and said side walls having slot means opening to said chamber cavity remote from said guides such that a received web in said chamber cavity tends to seal said chamber cavity between said side walls until said received web is disposed into said chamber cavity adjacent said slot means whereby air flows into the chamber cavity past said received web for regulating the received web displacement in said chamber cavity.

10. The method of operating a reel-to-reel magnetic tape recorder having a tape path means extending between a pair of tape-containing reels having a tape extending therebetween, and means for selectively rotating said reels to transport tape therebetween at a substantially constant tension, but subject to perturbations in tension, a transducing station disposed adjacent said tape path means to be in transducing relationship to said tape and disposed a given distance from a one of said tape reels;
the improved method comprising the steps of:
forming a dimple in said tape intermediate said transducing station and said one tape reel;
when said tension increases for tending to shorten the length of tape between said transducing station and said one tape reel applying a maximal force on said tape in said formed dimple which tends to maintain said dimple to prevent said tape length from shortening; and
when said tension decreases for tending to lengthen the length of tape between said transducing station and said one tape reel, reducing said force in said tape in accordance with the depth of said dimple such that said tape length tends not to increase due to decreasing tension whereby said tape length remains substantially constant at said given distance.

11. The method of regulating a web disposed as a bight in a chamber;
including the steps of:
exerting a pressure on said web to form said bight by exhausting air from said chamber;
in response to a given bight extent, regulating flow of air past said web into said chamber whereby said pressure on said web varies to maintain the bight displacement in said chamber at about a reference position in said chamber.

12. A magnetic tape recorder having a machine reel for receiving and supplying magnetic tape and means for receiving a supply reel containing magnetic tape, tape path means for selectively transporting tape between said reels at a relatively constant tension, transducer means in juxtaposition with said tape path means for being in a transducing relationship with a magnetic tape being transported between said reels;
the improvement including in combination:
means interposed between said supply reel means and said transducer means for receiving said magnetic tape and including tape length adjusting means responsive to variations in said tension for tending to increase tape length between said reel and said transducing means for increased tension and tending to reduce said tape length between said reel and said transducer means for decreasing tension such that changes in tension do not change the length of tape between said supply reel means and said transducer means whereby a stabilized recording relationship is maintained between said transducer means and said magnetic tape being transported between said reels.

13. The magnetic tape recorder set forth in claim 12 wherein said interposed means includes vacuum chamber means having an opening to receive the tape and being adapted to receive said magnetic tape and having a pair of longitudinally-extending, spaced-apart sidewalls disposed somewhat parallel to the direction of transport of said magnetic tape and having a laterally enlarged chamber such that as said tape forms a bight in said vacuum chamber means and enters said chamber, air tends to flow past said tape into said chamber thereby reducing vacuum chamber means pull on said tape for regulating the length of tape between said supply reel means and said transducer means.

14. The magnetic tape recorder set forth in claim 12 or 13 further including air bearing means and guide means juxtaposed to said interposed means for receiving said tape while transported into and out of said interposed means whereby said tape is not only stabilized against tension variations but is also stabilized in a longitudinal guiding relationship between said reel said supply reel means and said transducer means.

15. The magnetic tape recorder set forth in claim 14 wherein said transducer and both of said reel means are lying along a single plane and said tape path means extending along said plane, said transport means including separate control means coupled to both said reel means, respectively, for transporting tape therebetween in either direction under said substantially constant tension, said machine reel being disposed centrally of said plane, said supply reel means being disposed at one corner of said plane, a tension sensing means coupled to said tape transport means disposed at a corner of said plane opposite said tape reel supply means for sensing tension of said tape as it moves with respect to said machine reel, said transducer means being disposed along one end portion of said plane opposite said tension sensing means and said supply reel means, a pair of guides at two corners respectively of said plane on either side of said transducer means, an adapter to receive said tape from said interposed means and from said tension transducer means for guiding tape past said transducer means and said interposed means being along one edge of the plane intermediate said supply reel means and a first one of said guide means interposed between said transducer means and said supply reel means; and air supply and exhaust means pneumatically coupled to said guide means and to said interposed means for respectively supplying and exhausting air to and from said respective means.

* * * * *